United States Patent [19]

Midland

[11] 4,300,157
[45] Nov. 10, 1981

[54] MEANS FOR ENHANCING UNIFORMITY IN ELECTRON BEAM SPOT SIZE IN TELEVISION PICTURE TUBES

[75] Inventor: Richard W. Midland, Inverness, Ill.

[73] Assignee: Zenith Radio Corporation, Glenview, Ill.

[21] Appl. No.: 120,025

[22] Filed: Feb. 11, 1980

[51] Int. Cl.³ .............. H04N 9/24; H04N 5/68; H01J 29/52; H01J 29/56
[52] U.S. Cl. ........................... 358/74; 358/67; 358/242; 315/386
[58] Field of Search ............... 358/39, 64–70, 358/74, 242, 243; 315/382, 383, 386

[56] References Cited

U.S. PATENT DOCUMENTS

| | | | |
|---|---|---|---|
| 2,613,333 | 10/1952 | Bull | 315/386 |
| 2,698,400 | 12/1954 | Schreiber | 315/382 |
| 4,196,446 | 4/1980 | Rowe et al. | 358/74 |

*Primary Examiner*—John C. Martin
*Attorney, Agent, or Firm*—Ralph E. Clarke, Jr.

[57] ABSTRACT

This disclosure depicts means for providing greater spot size uniformity across the screen of cathode ray picture tubes. A beam-current-control signal is derived from the horizontal scansion circuit means in which the amplitude of the signal varies monotonically as a function of the distance of the beam spot from the minor axis of the faceplate. Means for receiving the beam-current-control signal for modulating the luminance signal are provided. The beam-current-control signal has such characteristics that the modulation causes a predetermined gradational reduction in beam current at least from the minor axis to the minor sides of the faceplate to inhibit beam spot enlargement in faceplate side zones and thus provide greater spot size uniformity across the screen.

2 Claims, 6 Drawing Figures

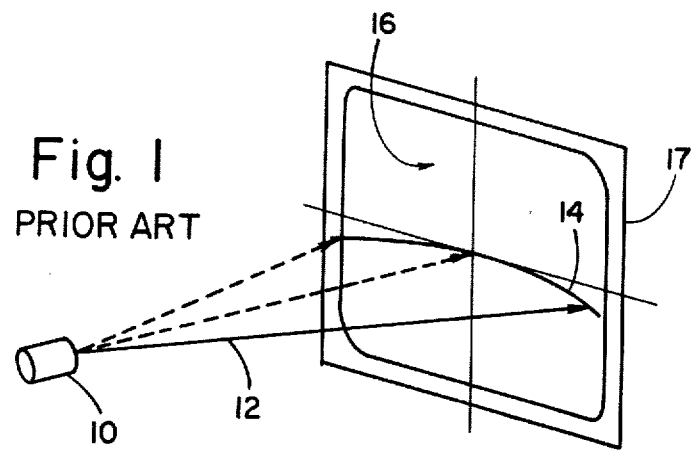
Fig. 1
PRIOR ART
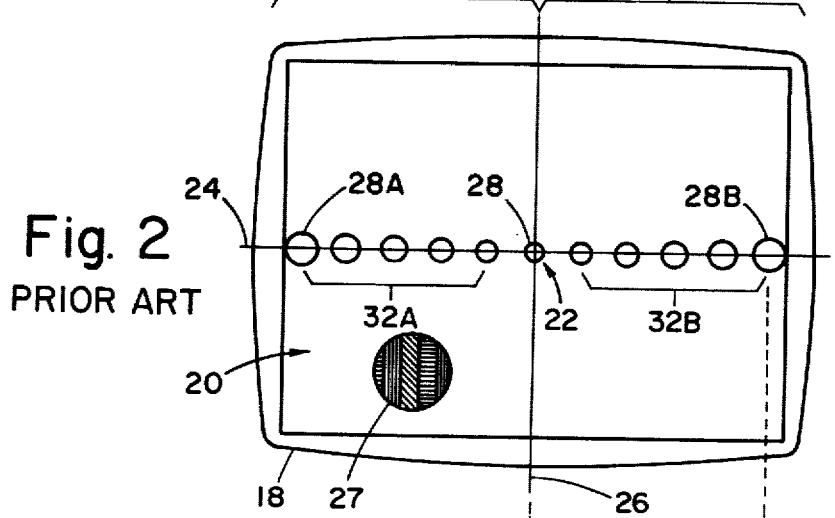
Fig. 2
PRIOR ART
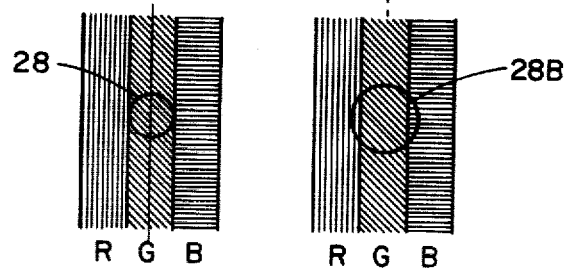
Fig. 2A
PRIOR ART
Fig. 2B
PRIOR ART

MEANS FOR ENHANCING UNIFORMITY IN ELECTRON BEAM SPOT SIZE IN TELEVISION PICTURE TUBES

CROSS-REFERENCE TO RELATED APPLICATION

This application is related to copending application by William A. Rowe and James W. Schwartz, 963,533, now U.S. Pat. No. 4,196,446, filed Nov. 24, 1978, of common ownership herewith.

BACKGROUND OF THE INVENTION

This invention relates to television picture tubes, and is concerned primarily with greater uniformity in electron beam spot size across the imaging screen, especially in beam index picture tubes.

Ideally, the beam-index color television tube provides full color reproduction of a transmitted television signal by means of a single beam and without the need for an aperture mask. The essentials of the beam index system comprise a screen consisting of a pattern of triplets of phosphor stripes—red, green and blue; and an electron gun capable of projecting a beam spot of a diameter approximating stripe width; means for sensing spot location in relation to the patterns of triads, and means for modulating the beam with picture information. More than 200 patents have been issued in the field of beam index tubes including such significant disclosures as U.S. Pat. Nos. 2,415,059 to Zworykin; 2,545,325 to Weimer; 2,587,074 to Sziklai; 2,742,531 to Partin; 2,892,123 to Sunstein; and 3,469,024 to Schwartz. Interest in the beam index system has persisted because of the theoretical advantages over the widely used shadow mask system such as a lower energy consumption, high resolution, and in single-beam systems, no convergence problems.

However, the attainment of a viable beam index system able to compete with the shadow mask system has yet to be realized. While elegantly simple in concept, the beam index system in practice has proved to be fraught with problems. A major problem and one to which the present invention is addressed, concerns beam spot size. For proper operation, the width of the scanning spot must approximate the width of each of the discrete stripes on which the beam impinges, and this size relationship must be maintained at all points on the imaging screen. In a 13-inch beam index tube, for example, spot size is desirably of the order of five mils, closely matching the width of each of the stripes.

The magnitude of the current of the electron beam has a pronounced effect on beam spot size. This fact has important bearing on the invention disclosed herein, as will become evident.

Another factor having a marked effect on spot size as the electron beam scans the picture imaging screen deposited on the faceplate is the variance in the "throw" distance from the electron gun to a given point on the screen. The result of this variance is indicated schematically by FIG. 1, wherein an electron gun 10 is shown as projecting an electron beam 12 onto a picture imaging screen 16 of a faceplate 17. The points of focus of gun 10 normally defines an arc, while the area being scanned—the screen 16 of faceplate 17—lies on an arc of much greater radius and hence is relatively planiform in comparison.

The effect of arcuately scanning the relatively planiform surface is illustrated diagramatically by FIG. 2. A substantially rectangular faceplate 18 is shown wherein the picture imaging screen 20 has a center point 22 located at the intersection of major axis 24 and minor axis 26 of faceplate 18. Section 27 represents an area of screen 20 greatly enlarged to indicate a pattern of triplets of red-, green-, and blue-light-emitting phosphor stripes deposited thereon. A beam spot 28 is shown as being centered on center point 22. The orientation of the hypothetical electron gun and center point 22 is such that center point 22 is in alignment with the axis of the gun. When beam spot 28 lands at center point 22, which lies on the axis of the gun, beam spot 28 is at its smallest diameter.

However, as a result of the scanning of screen 20 by the traverse of the beam across screen 20, beam spot 28 is undesirably gradationally enlarged from the minor axis 26 to the minor sides of faceplate 18. This gradational enlargement of beam spot 28 is indicated for left side zone 30A by beam spots 32A indicated by the bracket, culminating in the enlarged beam spot indicated by spot 28A. In side zone 30B, beam 32B indicated by the bracket, are similarly shown as being gradationally enlarged from the minor axis to the right-most side of the screen, culminating in an enlarged beam spot indicated by spot 28B.

The undesired effects of such beam spot enlargement in faceplate side zones of a beam index tube, for example, is indicated schematically by FIGS. 2A and 2B, associated with FIG. 2. FIG. 2A represents, greatly enlarged, the triplet of red-, green-, and blue-light-emitting phosphor stripes of substantially equal width at the location on the screen 20 of beam spot 28. FIG. 2B represents an identical triplet of stripes at the location on faceplate 18 of enlarged beam spot 28B. A guard-band (not shown) may intervene the stripes.

Beam spots 28 is shown in FIG. 2A as being substantially equal in width to the green stripe upon which it impinges, and the color purity of the triplet (and image display) is maintained. The enlargement of beam spot 28, however, indicated in FIG. 2B by spot 28B located at the side of screen 20, renders it substantially larger than the green stripe upon which it is intended to impinge. The resulting overlap onto the adjacent red- and blue-light-emitting phosphor stripes causes hue and saturation errors. Also, a beam spot so enlarged can overlap a beam indexing stripe (not shown, but which should be considered as lying in association with the triplet), causing beam-indexing errors, as well.

It is to be understood, of course, that the gradational enlargement of the spot takes place at least from the minor axis to the minor sides (the left and right sides as distinguished from top and bottom sides) of the faceplate. As noted by arrow 34, a scanning beam may traverse the screen 20 from left to right, as in this example. As the beam enters the left side of side zone 30A, the beam spot will be relatively large when it enters side zone 30A, then, as indicated by spot 28A, the beam spot will become progressively relatively smaller as the beam approaches beam spot 28, as indicated by spots 32A, then grow progressively relatively larger in traversing side zone 30B, as indicated by spots 32B, culminating in the enlarged spot 28B at the right-most side of screen 20. Such center-to-side gradational enlargement of a beam spot takes place at all levels of the minor axis 26 during the horizontal scansion.

The gradational enlargement of the beam spot from the minor axis to the minor sides of the faceplate can result in many deleterious effects. The enlargement can be substantial; for example, the increase in spot size from the minor axis to the minor sides of the faceplate due to the deflection of a beam of a thirteen-inch, 100°-deflection picture tube is about twenty percent at the sides of the faceplate. In terms of the effect of such enlargement of spot size, a twenty-percent increase in the diameter of a twelve mil spot impinging on a twelve mil stripe, for example, would result in an unacceptable spot size of greater than fourteen mils. The resulting overlapping onto adjacent stripes could result in errors in hue, color saturation and indexing.

PRIOR ART STATEMENT

Techniques for dynamically varying the focus, convergence, and intensity of electron beams are well-known in the art. Dynamic focusing, for example, has been used to cause a beam to be in focus at the sides of the picture imaging field as well as at the center of the field. The need for dynamic focusing arises from the aforedescribed arcuate scanning of the beam relative to the relatively planiform faceplate.

Dynamic focusing of a beam can be accomplished electronically by means of a focus-control signal modulated at the scanning frequency, with the signal being applied to a suitable beam-focusing electrode. Dynamic focusing means is disclosed by Richard in U.S. Pat. No. 3,412,281. An A.C. control signal is employed which is proportional to the distortion due to defocusing inherent in tube faces, according to Richard. The A.C. control signal is converted into a D.C. control signal which may be added to the relatively high-level constant voltage of the tube focusing circuit. Other approaches to dynamic focusing are disclosed by U.S. Pat. Nos. 2,801,363 and 3,084,276.

Convergence of the beams of a multiple-beam electron gun is required to vary as the beams arcuately scan the relatively planiform faceplate. Beam convergence may be achieved dynamically by slightly varying the relative angles of the beams while scanning. In dynamic convergence solely by electronic means, signals to induce dynamic convergence may be derived from the horizontal and vertical circuits of the television receiver system to provide a dynamic convergence-correction signal having the characteristics of a parabola. The voltage of the convergence-correcting signal is zero at the center of the picture imaging field, and changes towards the sides of the screen to effect convergence. Dynamic convergence signals may be applied to convergence coils located adjacent to the picture tube neck. Such a dynamic convergence circuit is disclosed by Nelson in U.S. Pat. No. 2,834,911. Parabolic convergence current waves are obtained by integration of pulse and sawtooth voltage waves in resistive and inductive reactive circuits, according to the teachings of Nelson.

Shreve in U.S. Pat. No. 2,739,26 discloses means for controlling trace brightness in accordance with an average signal applied to the deflection plates of a cathode ray tube. U.S. Pat. No. 2,993,142— Harvey discloses means for maintaining constant beam brightness in a cathode ray tube by compensating for changes such as those which occur when sweep speed is changed, or, when short pulses, or long pulses with a short rise time, are viewed.

OBJECTS OF THE INVENTION

It is a general object of this invention to improve the picture quality of television cathode ray picture tubes.

It is another less object of this invention to improve the picture quality of color cathode ray tubes by providing greater uniformity in beam spot size.

It is a less general object of this invention to reduce the incidence of errors in hue, saturation and indexing in beam-index tubes.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in the several flanges of which like reference numerals identify like elements, and in which:

FIG. 1 is a diagram showing schematically the effect of the arcuate scanning of the screen of a relatively planiform faceplate by an electron beam;

FIG. 2 is a diagram showing the gradational enlargement of a beam spot on a picture tube screen; FIGS. 2A and 2B comprise enlarged schematic representations of the beam spot-stripe width relationships of FIG. 2;

DESCRIPTION OF THE PREFERRED EMBODIMENT

Figure 3:
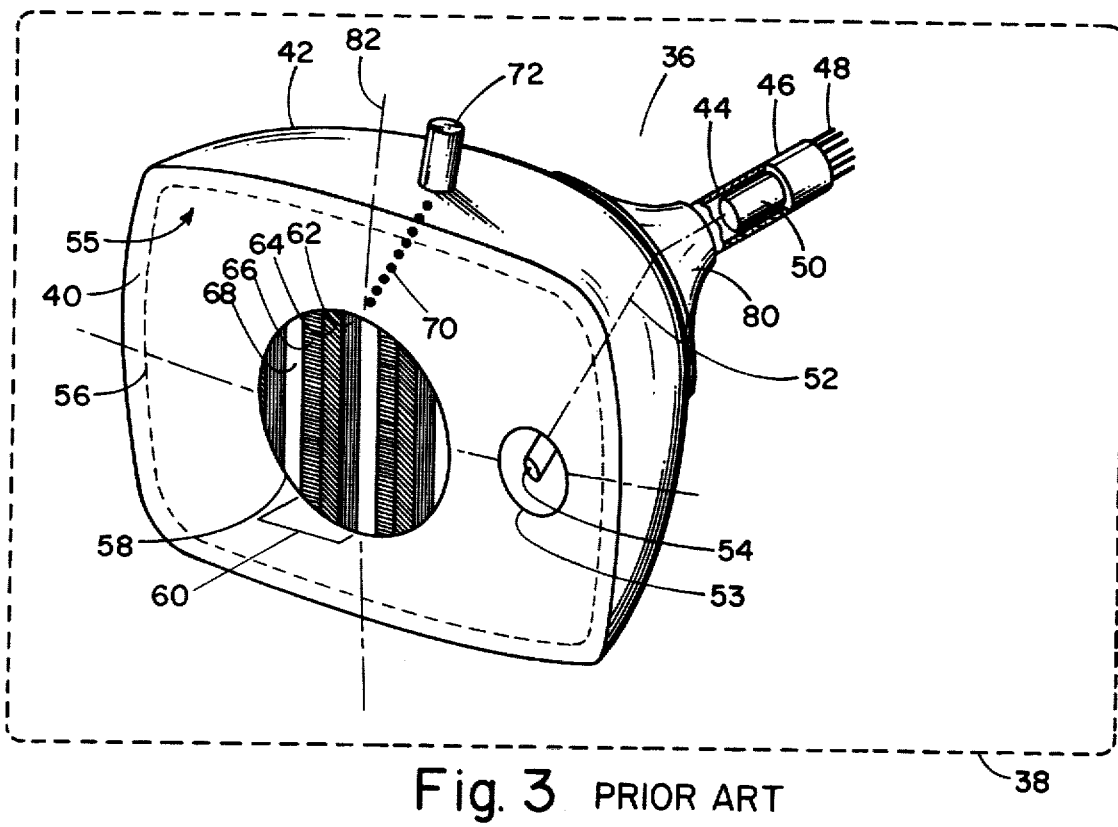
FIG. 3 is a view in perspective partly in section and partly cut away of a prior art beam index picture tube; and, FIG. 4 is a schematic diagram of circuit means for developing a beam-current-control signal according to the invention.

FIG. 3 depicts a beam-index cathode ray picture tube 36 and an associated television receiver system 38, indicated highly schematicall by the enclosing broken line, wherein the invention may be advantageously employed. Picture tube 36 comprises an evacuated envelope including a substantially rectangular imaging faceplate 40, a funnel 42, a neck 44, and a base 46 through which protrudes a plurality of electrical connectors 48 for making electrical connection from external circuits to the components located within the envelope of tube 36. An electron gun 50 is located in the neck 44. Gun 50 is shown as generating and projecting an electron beam 52; section 53, representing an area of faceplate 40 greatly enlarged, shows the spot 54 of beam 52 landing on the phosphor-bearing picture imaging screen 55 of faceplate 40; the boundaries of the screen 55 are indicated by the dash lines 56.

Section 58 represents another area of screen 55 greatly enlarged to indicatea deposition of a pattern of triplets of phosphor stripes of substantially equal width. Triplet 60, indicated by the bracket, should be considered as being representative of all other triplets deposited on screen 55. Triplet 60 is shown as being made up of red-, green-, and blue-light-emitting phosphor stripes 62, 64 and 66, respectively.

Associated with triplet 60 is an indexing stripe 68; an identical indexing stripe is associated with each of the other triplets. Upon impingement by beam spot 54 on the screen 55 during the scansion of beam 52, index stripe 68 emits an indexing signal which may comprise, for example, an emission of ultraviolet radiation within the envelope of tube 36. An increment 70 of the ultraviolet emission indicated by the dotted line, is shown as being intercepted by a detector 72 which may comprise a multiplier phototube. The indexing signal is amplified and applied as a control signal to circuits (not shown) which control the sequential application of appropriate color signals to triplet 60 as beams 52 scans the triplet.

In company with other standard circuits for reproducing television broadcast signals, the application and operation of which are well-known in the art, television receiver system has means for developing a luminance signal, and horizontal and vertical scansion circuit means (not shown). The luminance signal is developed in the television receiver luminance channel which produces the signal by amplifying the luminance portion of the video signal. The luminance signal controls image brightness by controlling electron beam current. In the context of this disclosure, the luminance signal connotes all major factors controlling image brightness.

Beam 52 is caused to scan screen 55 by the influence of a deflection yoke 80 which in turn is controlled by the horizontal and vertical scansion circuit means. As described supra, beam 52 will define an arc in scanning the relatively planiform faceplate 40 and screen 55 deposited thereon. In consequence, it may be necessary to dynamically focus beam 52 so that beam spot 54 will always be in focus at every point on screen 55. Although beam spot 54 may be caused to remain in focus on all points on screen 55 by dynamic focusing, the undesired gradational enlargement of beam spot 54 at least from the minor axis 82 of substantially rectangular faceplate 40 to the minor sides will nevertheless occur to the detriment of color purity and indexing accuracy—a problem to which this invention is addressed.

The means according to the invention for providing greater spot size uniformity across the screen of television cathode ray picture tubes comprises means for deriving a beam-current-control signal from the horizontal scansion circuit means of the television receiver system in which the amplitude of the signal varies monotonically as a function of the distance of the beam spot from the faceplate minor axis. Means are provided for receiving the beam-current-control signal for modulating the luminance signal developed by the receiver system with the beam-current-control signal. The beam-current-control signal has such characteristics that the modulation causes a predetermined gradational reduction in beam current at least from the minor axis to the minor sides of the faceplate. The result is to inhibit beam spot enlargement in faceplate side zones and thus provide greater spot size uniformity across the screen.

The preferred mode for implementing my invention in a three-beam, aperture-mask-type picture tube, conceived after my invention, is fully described and claimed in referent copending application Ser. No. 963,533, now U.S. Pat. No. 4,196,446, fully incorporated by reference herein. A preferred mode of carrying out the present invention in a beam-index tube is described in the following.

Figure 4:
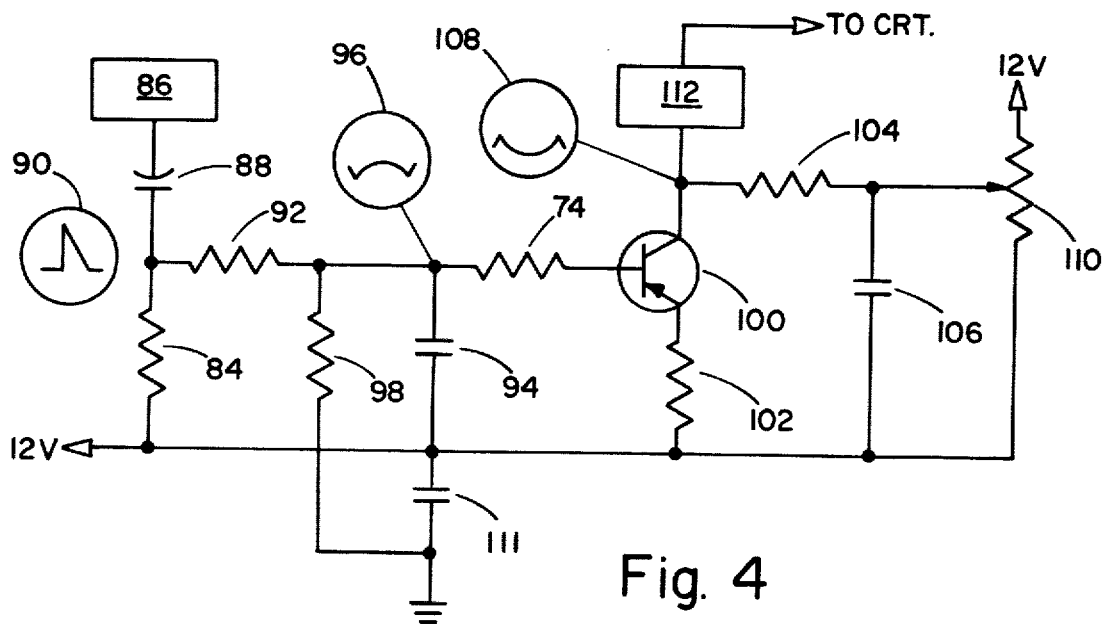

The electron beam-current-control signal according to the invention is preferably in the form of a parabola, although it could as well be a curve of another form. A means for deriving a suitable electron-beam-current control signal from the horizontal scansion circuit of a standard television receiver system is shown schematically in FIG. 4. The values of components given in this and other descriptions comprising this disclosure are merely by way of illustration and are not limiting.

The horizontal scansion circuit of the conventional television system produces a periodically recurring sawtooth waveform which causes the electron beam or beams to horizontally scan the screen deposited on the faceplate, as is well-known in the art. In this example, the sawtooth waveform is indicated as being taken from the horizontal yoke circuit although it could as well be drawn from any of a number of other suitable points in the television receiver system circuit where the waveform is present. A resistor 84 having a value of 0.47 ohms is shown as being inserted in series with the horizontal yoke circuit, indicated schematically by block 86. The direct current potential across resistor 84 is set at a nominal 12 volts by means of capacitor 88 which may have a value, for example, of 0.33 microfarads. A sawtooth waveform 90 having a value of one volt peak-to-peak is thus developed at the junction of resistors 84 and 92. Resistor 92 may have a value of 2.2 kilohms, for example.

The sawtooth waveform 90 is integrated by an integrating network comprising resistor 92 and capacitor 94; resistor 92 may have a value of 100 ohms and capacitor 94 a value of 0.1 microfarads. The integrated signal produced from a sawtooth waveform 90 is in the form of a parabola 96. Resistor 98, which may have a value of 30 kilohms, functions as a D.C. level shifter to provide the proper bias to the base of transistor 100. The function of transistor 100 is to amplify the parabola-shaped signal 96. Resistor 102 provides for stabilization of the base-emitter circuit of transistor 100; its value may be 100 ohms. Resistor 104 and capacitor 106 are provided to add the normal D.C. picture level signal to the parabolic waveform so formed so as to provide a composite signal having a true parabolic wave shape, indicated by waveform 108. The amplitude of the parabolic waveform 108 is about one volt peak-to-peak, for example, and the frequency is H (63.5 microseconds). Potentiometer 110, which comprises a part of a standard television circuit, provides for picture contrast control.

The parabolic waveform 108 comprises an electron-beam-current-control signal to which the amplitude is caused to vary monotonically as a function of the distance of the beam spot from the minor axis of the faceplate. This signal may be routed to the television receiver system luminance channel, for example, indicated schematically by block 112. The electron-beam-current-control signal so developed may be used to modulate the normal luminance control signal of the television receiver system. The beam-current-control signal has characteristics such that modulation of the luminance signal causes a predetermined gradational reduction in beam current at least from the minor axis of the faceplate to the minor sides of the faceplate to inhibit beam spot enlargement and provide greater spot size uniformity across the screen.

In terms of actual amount of beam current reduction required to achieve the objectives of the invention, the following values are provided, but for purpose of example only, and are intended to be in no way limiting. The beam current from the minor axis to either the left- or right-most boundary of the screen may vary, for example, from one milliampere at a white square located on the minor axis to 0.6 milliampere at an equivalent white square at the boundaries. If the beam-current-control signal is a parabola such as produced by the circuit of FIG. 4, the value of the current from the minor axis to the boundary of either side will fall off as the square of the distance. The signal, however, could as well be two sawtooth waveforms shown by 90 in FIG. 4, and oriented back-to-back; in this case, the fall-off in beam current from minor axis to the minor sides would be linear.

A particularly attractive feature of the beam-index system is the provision of a full color picture at a fraction of the power consumption of the standard aperture-mask receiver system. A significant power saving is realized in the fact that the beam-index system normally requires only a single beam in lieu of the three beams of the aperture mask system. Further, an aperture mask absorbs about 80 percent of beam energy, converting the energy to heat; the beam index tube requires no aperture mask. The inherent power saving of the beam-index system is further enhanced by the means according to the invention in that the predetermined gradational reduction in beam current from the minor axis to the minor sides of the faceplate can provide a reduction of power consumption of as much as 15 percent in 13-inch system, for example, resulting in a system power saving of 3.5 watts. This seemingly small saving in energy becomes highly significant when mass-production of beam-index systems is considered.

It will be recognized that the gradational reduction of beam current at from the minor axis to the minor sides of the faceplate according to the invention will also produce a concurrent, gradational reduction in image brightness in the side zones. However, tests have shown television viewers to be unperceptive of non-abrupt brightness reductions of as much as 40 percent, so the benefits of the inventioncan be achieved without noticeable detriment to the observable brightness uniformity of the television picture.

Application of the present invention is not limited to the basic beam index system set forth as an example in the foregoing, but to all variations and elaborations of the basic beam-index design concept developed over the years. In addition, television receiver systems in which the invention may also be advantageously employed include, in addition to the aforedescribed beam-index picture tube system, any cathode ray television tube received system wherein the diameter of the electron-beam (or spots in a plural-beam system) is undesirably gradationally enlarged from the minor axis of the faceplate to the mirror sides of the faceplate.

Other changes may be made in the above-described apparatus without departing from the true spirit and scope of the invention herein involved, and it is intended that the subject matter in the above depiction shall be interpreted as illustrative and not in a limiting sense.

I claim:

1. In a television receiver system having a cathode ray picture tube including a substantially rectangular faceplate with a phosphor-bearing imaging screen deposited thereon, and at least one electron gun for projecting at least one electron beam on said screen to produce a spot for picture imaging, said receiver system having means for developing a luminance signal, and horizontal and vertical scansion circuit means for scansion of said beam spot, and wherein said beam spot is undesirably gradationally enlarged from the minor axis of said faceplate to the minor sides of said faceplate, means for providing greater spot size uniformity across the screen comprising:
   means for deriving a beam-current-control signal from said horizontal scansion circuit means in which the amplitude of said signal varies monotonically as a function of the distance of said beam spot from said minor axis; and,
   means receiving said beam-current-control signal for modulating said luminance signal with said beam-current-control signal, said beam-current-control signal having such characteristics that said modulation causes a predetermined gradational reduction in beam current at least from said minor axis to the minor sides of said faceplate to inhibit beam spot enlargement in the side zones and thus provide greater spot size uniformity across the screen.

2. In a television receiver system having a beam-indexing cathode ray picture tube including a substantially rectangular imaging faceplate, said faceplate having deposited on the inner surface thereof a screen comprising a pattern of triplets of stripes of substantially equal width, said triplets each being made up of red-, green-, and blue-light-emitting phosphor stripe and an associated index stripe, said picture tube including at least one electron gun for projecting at least one electron beam on said screen to produce a spot for picture imaging and for activating said indexing stripe, the width of said beam spot on the minor axis of said faceplate being substantially equal to the width of said stripes, said receiver system having means for developing a luminance signal and horizontal and vertical scansion means for scansion of said beam spot, and wherein said beam spot is undesirably gradationally enlarged from the minor axis of said faceplate to the minor sides of said faceplate resulting in image hue and saturation errors and indexing errors, means for providing greater spot size uniformity across the screen comprising:
   means for deriving a beam-current-control signal from said horizontal scansion circuit means in which the amplitude of said signal varies monotonically as a function of the distance of said beam spot from said minor axis; and,
   means for receiving said beam-current-control signal for modulating said luminance signal with said beam-current-control signal, said beam-current-control signal having such characteristics that said modulation causes a predetermined gradational reduction in beam current at least from said minor axis to the minor sides of said faceplate to inhibit beam spot enlargement in side zones and thus provide greater spot size uniformity across the screen.

* * * * *